(No Model.) 2 Sheets—Sheet 1.
E. F. MORSE.
TWO WHEELED VEHICLE.
No. 417,267. Patented Dec. 17, 1889.
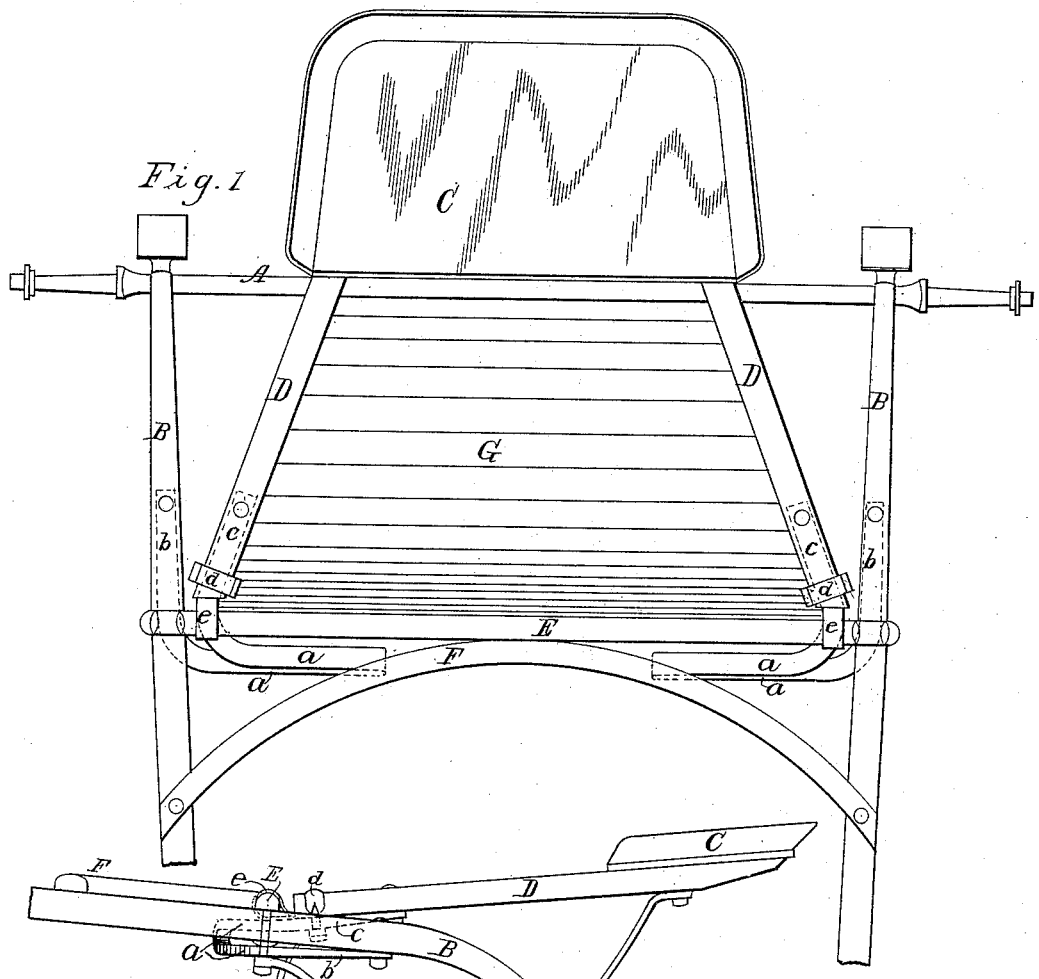
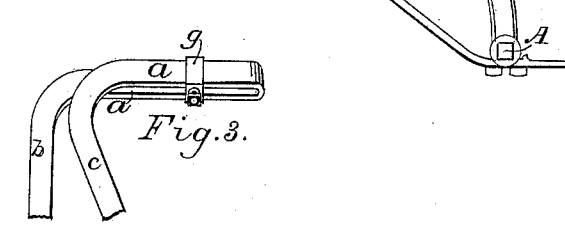
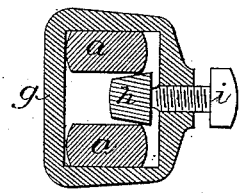
WITNESSES: INVENTOR:

(No Model.) 2 Sheets—Sheet 2.
E. F. MORSE.
TWO WHEELED VEHICLE.
No. 417,267. Patented Dec. 17, 1889.
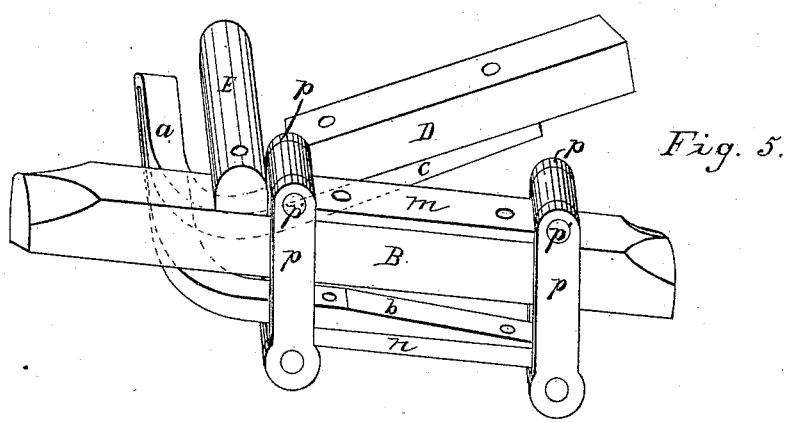
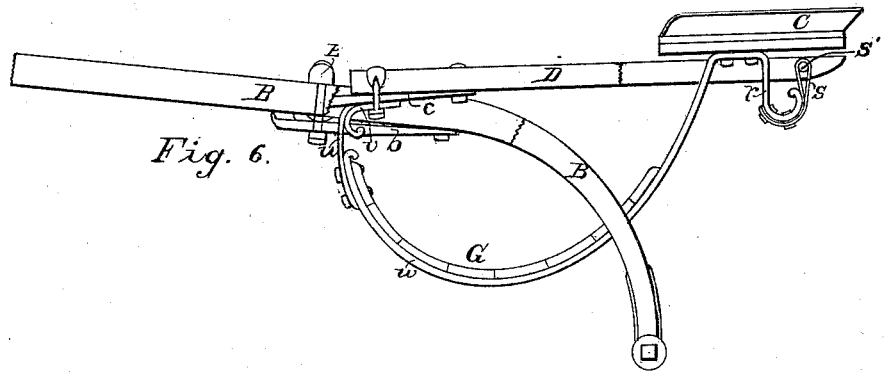

UNITED STATES PATENT OFFICE.

EVERETT F. MORSE, OF TRUMANSBURG, NEW YORK.

TWO-WHEELED VEHICLE.

SPECIFICATION forming part of Letters Patent No. 417,267, dated December 17, 1889.

Application filed June 20, 1889. Serial No. 314,933. (No model.)

*To all whom it may concern:*

Be it known that I, EVERETT F. MORSE, a citizen of the United States, residing at Trumansburg, in the county of Tompkins and State of New York, have invented certain new and useful Improvements in Two-Wheeled Vehicles, of which the following is a specification.

The objects of my invention are to provide a spring for two-wheeled vehicles, which shall be simple in construction and efficient in action, means for adjusting the flexibility of the spring to suit the load, and a device for relieving the seat from the disagreeable motion usually transmitted from the horse and commonly known as "horse motion;" and it consists of a peculiar arrangement of spring-bars connecting the fixed parts of the vehicle and seat-supporting arms, means for restraining more or less of said bars from yielding action, and a device for hanging the seat so that it can swing forward and backward, whereby it is relieved from the disagreeable horse motion common to two-wheeled vehicles. I attain these objects by the mechanism illustrated in the accompanying drawings, in which—

Figure 1 is a plan view of a part of the vehicle with my improvements in springs attached. Fig. 2 is a side elevation of the same. Fig. 3 is a perspective view of the spring, and Fig. 4 is a cross-section of the torsion branches of the spring and illustrating the adjusting mechanism. Fig. 5 is a perspective view of my spring and an anti-horse motion device connecting the same to the thills. Fig. 6 is a side elevation of my anti-horse motion device in the form I deem best adapted for practical use.

Referring to the drawings, A is the axle; B, the thills attached to the axle.

E and F are the back and front cross-bars having their ends bolted to the thills.

C is the seat, and D the arms supporting the seat.

$a$ $b$ $c$ are the spring-bars connecting the seat-bars D with the fixed parts of the vehicle, preferably with the thills. These spring-bars consist of two torsional branches $a$ $a$ extending transversely of the vehicle, and which are rigidly connected together at one end and provided with arms $b$ and $c$, extending from their other ends substantially perpendicular to said torsional branches. In the present case the springs are shown to be made from one piece by bending the bar so as to form the several parts above described. One of said arms $c$ is rigidly attached to the seat-supporting arm D and the other $b$ to the fixed parts of the vehicle, preferably to the thills.

$e$ $e$, Figs. 1 and 2, are safety-straps, which pass around bar E and have their ends securely fastened to the seat-supporting bars D. These straps prevent the seat from becoming detached from the vehicle should the springs be broken from any cause. The effect of the weight of the seat and its load on these spring-bars is to bend the arms $b$ and $c$ and twist the torsional branches $a$ within the elastic limit, and the springs in yielding to the inertia of this weight permit the seat to rock up and down about the flexible connections they form with the thills, and thus provide a very easy-riding vehicle.

My adjustable device relates to means for restraining greater or less part of the torsional branches $a$ from yielding to the load, and consists of the adjusting-box $g$, Fig. 5, having an approximately rectangular form and adapted to receive the torsional branches $a$, as shown in Fig. 4. On one side the box is provided with a set-screw $i$, designed to screw against the wedge-shaped tongue $h$, which is adapted to extend between and hold apart the edges of the torsion-rods next to the set-screws $i$. The torsion-rods $a$ in yielding to the load turn through a small angle relatively to each other, the edges next to set-screws $i$ turning toward, and the opposite edges from, each other. The tongue $h$ prevents the former and the adjusting-box the latter and thereby restrains them from turning relatively to each other in these directions. The adjusting-blocks can be applied to the torsion branches at any point of their length and restrain the parts of these torsion branches between the points of application and their connected ends from yielding to the load. The stiffness of the spring is increased by attaching the adjusting-box farther from the connected ends of the torsion branches, and the spring will be given its maximum flexibility by removing the adjusting-box entirely, as shown in Figs. 1 and 2.

It is obvious that the tongue $h$ can extend integrally from the box $g$. With this arrangement, however, the side of the box $g$ opposite to the tongue should be replaced by a bolt, connecting the then free ends of the sides of the box bearing against the opposite faces of the torsional branches.

The vertical vibratory motion of the thills due to the motion of the horse is felt by the occupant of the vehicle as a forward and backward vibratory motion of the seat. My device for relieving the seat from this motion consists of a series of suspension-links supporting the seat so it can swing back and forth. This suspension device is illustrated in a form adapted to be hung from the thills in Fig. 5, and in a form adapted to be hung from the seat-supporting arms in Fig. 6.

Referring to Fig. 5, B is a portion of the thill; D, the lower end of the seat-supporting arms. E is a part of the cross-bar, and $a\ b\ c$ the spring, having one arm $c$ rigidly attached to the seat-supporting arms D, and the arm $b$ attached to my anti-horse motion device. This device consists of the suspension-links $p\ p$, arranged alike on both sides of the thills and hung in suitable boxes on top of the same. In the present case these journal-boxes are formed of the plate $m$, having eyes turned at its ends through which joint-pins $p'$ extend. A similar plate $n$ is hung to the lower ends of the suspension-links in a similar manner. To this plate the arm $b$ of the spring is securely attached. A similar anti-horse motion device is attached to the other thill.

Referring to Fig. 6, B is the thill; E, the cross-bar; D, the seat-supporting arms, and $b\ c$ the spring, all connected and constructed as in Figs. 1 and 2. $w$ represents the bars, to which the foot-rest G and seat C are attached. The seat C, foot-rest G, and bars $w$ thus rigidly attached together are suspended from the arms D by the suspension-links $u$ and $s$. The link $s$ has its lower end securely attached to arm $r$, which extends downward from, is rigidly attached to, and supports seat C, and its upper end passes over rod $s'$, which passes through the seat-supporting arms D. The link $u$ has its lower end firmly attached to the forward end of bar $w$, and its upper end is firmly attached to the forward end of bar D. The opposite side of the seat is supported by similar links, similarly arranged, and the whole is hung so that the seat is mounted a little above the backward end of arms D. The links $s$ and $u$ may be formed of leather or other suitable material.

The operation of my anti-horse-motion device is as follows: The suspension-links supporting the seat permit it to vibrate back and forth; but the time required to make a complete vibration like the pendulum is a function of the length of the links and will not be set in motion by a series of impulses whose time is out of unison with its own rate of vibration. The suspension-links are made of such a length that the seat will not vibrate on them in unison with the vibrations due to the motion of the horse, and therefore these latter vibrations are not communicated to the seat; but instead these links vibrate about their lower ends and thus relieve the seat from this disagreeable motion.

What I claim as new, and desire to secure by Letters Patent, is—

1. In a two-wheeled vehicle, the combination, with the axle, the thills, cross-bar connecting the thills, the seat, and seat-supporting arms, of springs supporting said arms and consisting of elastic rods formed or arranged so as to provide two nearly or quite parallel torsional branches extending side by side and transversely of the vehicle, said branches being rigidly connected at one end and provided with arms extending transversely from their opposite ends, said arms being securely attached to the thills or cross-bars near the thills and to the seat-supporting arms, respectively, substantially as described.

2. As a means for adjusting the flexibility of a vehicle-spring, the combination, with a spring provided with two substantially parallel branches arranged side by side, of an adjusting-box surrounding and a tongue extending between said branches, the whole adapted to be applied at various points of the length of said branches and to restrain them from turning relatively to each other, substantially as described.

3. The spring $a\ b\ c$, consisting of parallel torsion branches $a\ a$, joined together at one end and provided with supporting-arms at the other end, in combination with an adjusting-box consisting of a box $g$, surrounding said torsion branches and block $h$, and means for forcing and holding said block between said torsion branches, substantially as and for the purpose described.

4. In a two-wheeled vehicle, the combination, with the thills, and seat-supporting arms having their forward ends hung to said thills or the cross-bar connecting the thills and extending backward, of a seat and foot-rest rigidly connected together and suspended by links from said seat-supporting arms so as to be free to swing backward and forward, substantially as and for the purpose described.

EVERETT F. MORSE.

Witnesses:
SANFORD C. CONDE,
CHARING P. GREGG.